United States Patent

Dresden, III

[11] Patent Number: 5,678,453
[45] Date of Patent: Oct. 21, 1997

[54] START RATIO SELECTION FOR VEHICULAR AUTOMATED TRANSMISSIONS

[75] Inventor: John Dresden, III, Farmington Hills, Mich.

[73] Assignee: Eaton Corporation, Cleveland, Ohio

[21] Appl. No.: 595,317

[22] Filed: Feb. 1, 1996

[51] Int. Cl.⁶ .................................................. F16H 59/52
[52] U.S. Cl. ..................................... 74/335; 477/900
[58] Field of Search ........................... 74/335; 477/900; 280/840

[56] References Cited

U.S. PATENT DOCUMENTS

| | | | |
|---|---|---|---|
| 4,854,194 | 8/1989 | Kaneko et al. | 477/900 |
| 5,047,934 | 9/1991 | Saito | 477/900 |
| 5,385,515 | 1/1995 | Chan et al. | 477/75 |
| 5,390,561 | 2/1995 | Stine | 74/331 |
| 5,406,861 | 4/1995 | Steeby | 74/336 |
| 5,409,432 | 4/1995 | Steeby | 477/71 |
| 5,413,012 | 5/1995 | Davis | 74/335 |
| 5,415,604 | 5/1995 | Bates et al. | 477/78 |
| 5,416,700 | 5/1995 | Bates et al. | 364/424.1 |

FOREIGN PATENT DOCUMENTS

| | | | |
|---|---|---|---|
| 59-155653 | 9/1984 | Japan | 477/900 |
| 60-159450 | 8/1985 | Japan | 477/900 |

*Primary Examiner*—Dirk Wright
*Attorney, Agent, or Firm*—Howard D. Gordon

[57] ABSTRACT

A control for a vehicular automated transmission system (10) is provided with a sensor (40) for sensing a suspension system (42) condition parameter indicative of vehicle loading and includes a controller (20) utilizing logic rules for controlling the transmission system as a function thereof.

14 Claims, 2 Drawing Sheets

START RATIO SELECTION FOR VEHICULAR AUTOMATED TRANSMISSIONS

BACKGROUND OF THE INVENTION

1. Field of the Invention

The present invention relates to controls for vehicular automated transmissions and, in particular, to controls for sensing parameters indicative of vehicle suspension conditions varying with vehicle loading and utilizing same as control parameters for control of vehicular automated transmission operations. More particularly, the present invention relates to automated transmission controls for sensing suspension conditions indicative of vehicle loading and utilizing same to control selection of the transmission start ratio.

2. Description of the Prior Art

Automated vehicular transmission systems, including multiple-speed transmissions, are well known in the prior art, as may be seen by reference to U.S. Pat. Nos. 4,361,060; 4,648,290; 4,595,986; 5,406,861; 5,409,432; 5,413,012; 5,415,604 and 5,416,700, the disclosures of which are incorporated herein by reference. Multiple-speed mechanical transmissions having 9, 10, 12, 13, 16, 18 or more forward gear ratios are well known in the prior art, as may be seen by reference to U.S. Pat. No. 5,390,561, the disclosure of which is incorporated herein by reference.

As may be seen by reference to U.S. Pat. No. 5,385,515, the disclosure of which is incorporated herein by reference, in automated transmission systems having 9, 10, 12, 13, 16 or 18 forward speeds, depending upon current vehicle operating conditions, any one of the first 4 to 7 forward ratios may be appropriate start ratios, especially for heavy-duty trucks, which may have a gross combined weight ranging from about 15,000 pounds to about 80,000 or more pounds, depending upon loading.

Automated transmission systems sensing parameters indicative of engine or driveline torque and/or vehicle acceleration to control shift performance are known in the prior art, as may be seen by reference to U.S. Pat. Nos. 5,425,689; 5,335,566 and 5,272,939, the disclosures of which are incorporated herein by reference.

SUMMARY OF THE INVENTION

In accordance with the present invention, an improved vehicular automated transmission system is provided, having means to sense and/or receive vehicle suspension parameters indicative of vehicle loading (such as air suspension air pressure) and to utilize same to control operation (such as selection of the start ratio or the range of allowable start ratios) of the transmission system.

Accordingly, it is an objection of the present invention to provide a new and improved control for a vehicular automated transmission system. This and other objects and advantages of the present invention will become apparent from a reading of the following description of the preferred embodiment taken in connection with the attached drawings.

DESCRIPTION OF THE PREFERRED EMBODIMENT

Figure 1:
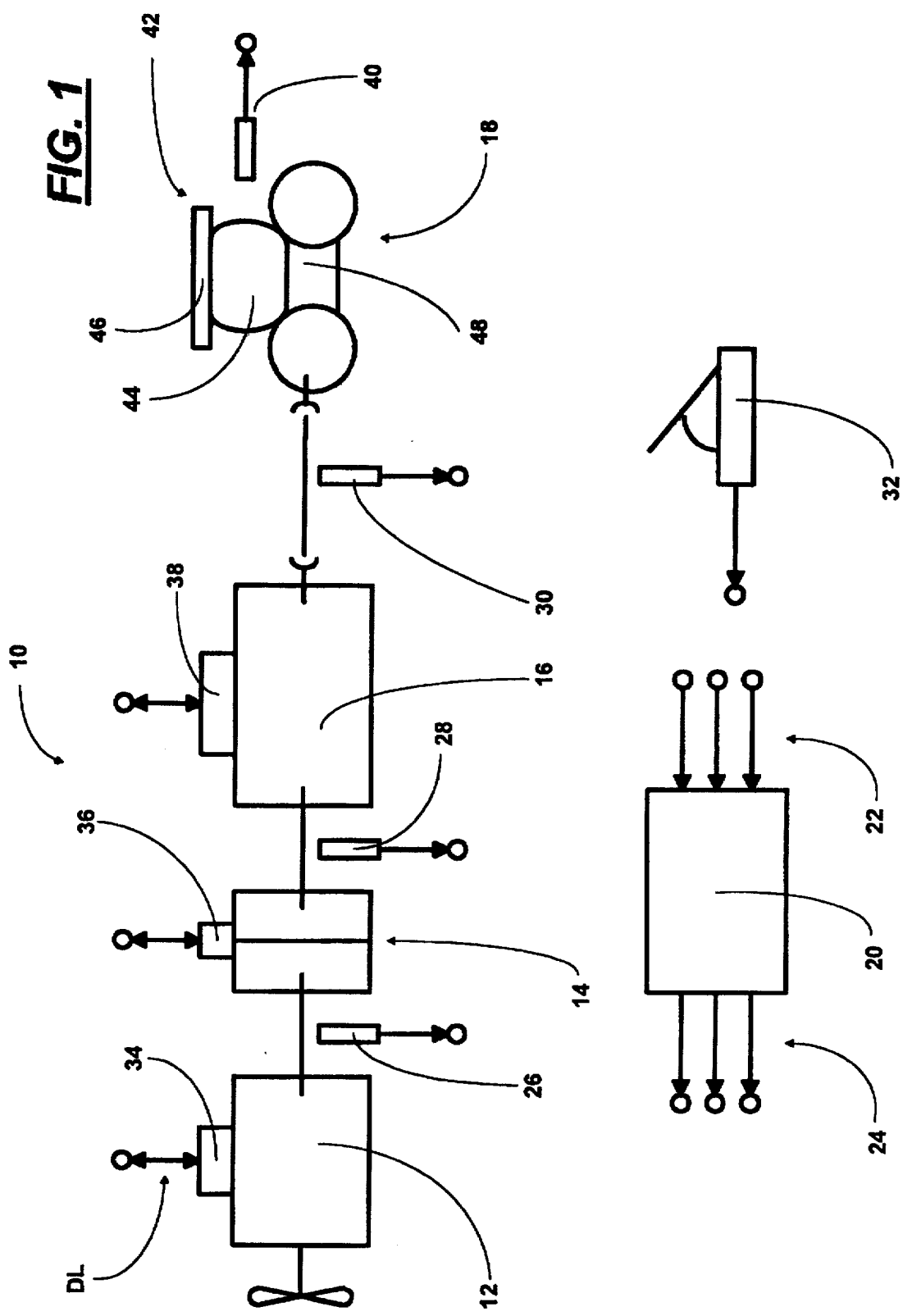
FIG. 1 is a schematic illustration of a vehicular automated transmission system incorporating the control system/method of the present invention.

A schematic illustration of a vehicular automated mechanical transmission system 10 utilizing the control system/method of the present invention may be seen by reference to FIG. 1. Systems of this general type may be seen in greater detail by reference to aforementioned U.S. Pat. Nos. 4,361,060; 4,595,986; 4,648,290 and 5,409,432.

Automated transmission system 10 includes a fuel-controlled internal combustion engine 12, a normally engaged, selectively disengaged master friction clutch 14, a multiple-speed automated mechanical transmission 16 and a tandem rear drive axle assembly 18 of the type illustrated in U.S. Pat. Nos. 4,862,025; 4,818,035 and 4,050,534, the disclosures of which are incorporated herein by reference.

A microprocessor-based electronic control unit (ECU) 20 receives input signals 22 and processes same in accordance with programmed logic rules to issue command output signals 24. The input signals 22 typically include signals from sensor 26 indicative of engine speed, from sensor 28 indicative of transmission input shaft speed, from sensor 30 indicative of transmission output shaft speed, and from sensor 32 indicative of throttle pedal position. The command output signals typically will control an engine fuel control actuator 34, a clutch actuator 36 and a transmission actuator 38. Preferably, the actuators also will provide feedback input signals to the ECU 20 indicative of the operation of the devices controlled thereby. Alternatively and/or in addition to the illustrated sensors, the vehicle may be provided with an electronic data link DL of the type defined in an industry standard protocol such as SAE J1922, SAE J1939 and/or ISO 11898.

Figure 2:
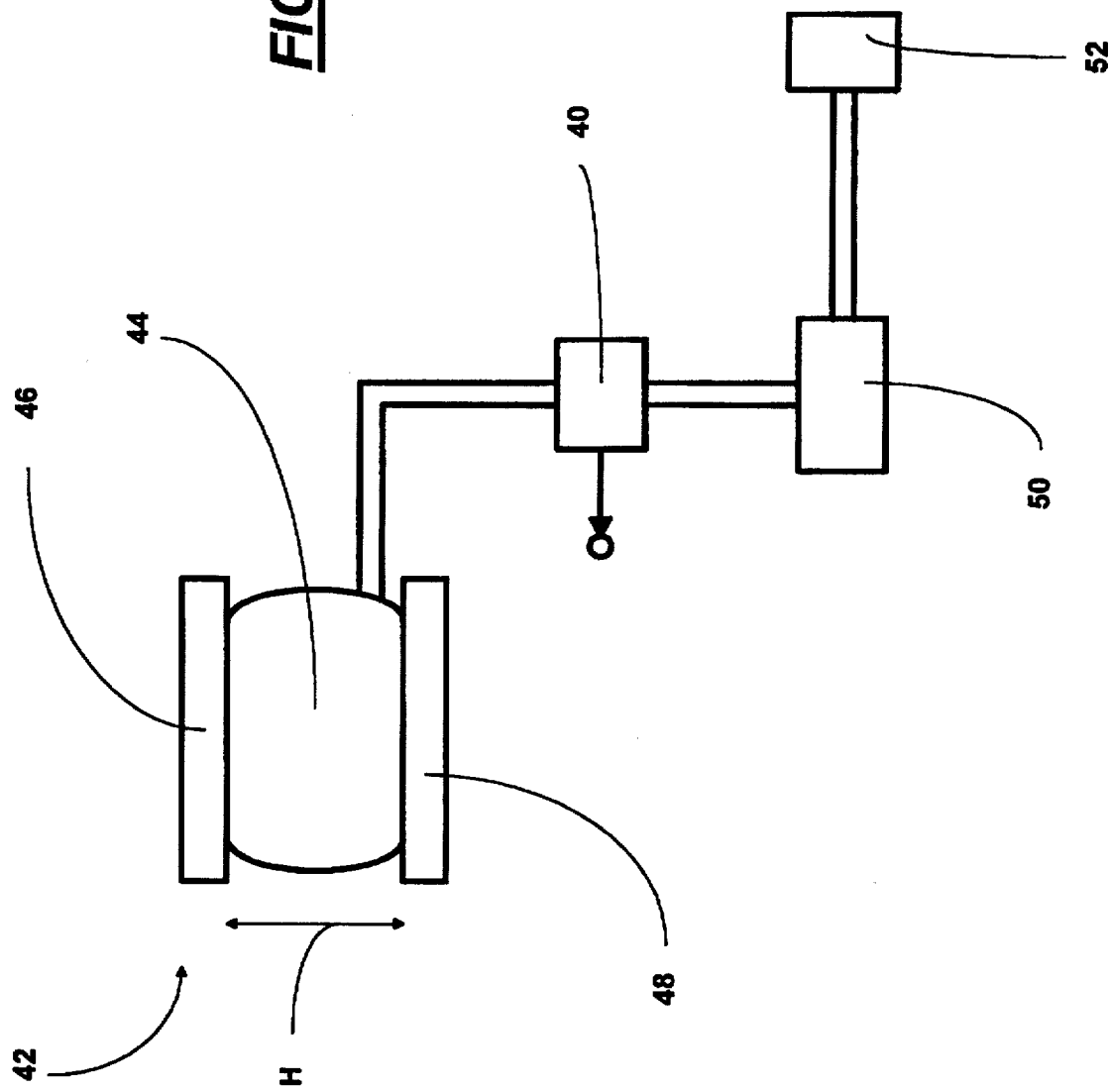
FIG. 2 is a schematic illustration of a preferred embodiment of the present invention.

In addition to the aforementioned sensors, the system 10 includes a sensor 40 for sensing one or more parameters of the vehicle suspension system 42 indicative of vehicle loading. In one example (see FIG. 2), the vehicle suspension system 42 includes a plurality of inflatable members ("air bags") 44 located between the vehicle frame 46 and an axle housing 48. The system 42 includes height (H) sensors and valves 50 connected to the vehicle onboard air system 52 for selectively pressurizing the air bags to maintain the vehicle level at a predetermined vehicle height. In such systems, usually referred to as "self-leveling systems," the pressurization of the air bags is indicative of the loading of the vehicle and, thus, sensor 40 provides a signal indicative of vehicle loading.

In a vehicle having an automatic leveling system, a relatively simple and inexpensive pressure switch having only two positions, high pressure and low pressure, indicative of two vehicle loading conditions, heavy load and light load, will provide improved transmission system performance. A sensor 40 providing continuously variable outputs, of course, will allow for more refined control of transmission system 10.

Of course, other suspension system parameters indicative of vehicle loading, such as height (H), spring deflections or the like also may be utilized.

In a transmission system having a multiple-speed transmission having, for example, between 9 and 18 forward speed ratios utilized in a vehicle having a gross combined weight which can vary, for example, from 20,000 to 80,000 pounds, the performance of transmission system 10 can be improved by having even an approximate indication (±5,000 to ±10,000 pounds) of vehicle loading. By way of example, for a lightly loaded vehicle, skip upshifts and a relatively high start ratio may be appropriate, while for a heavily loaded vehicle, only single shifts and a relatively low start ratio may be appropriate.

Accordingly, by utilizing vehicle suspension information indicative of vehicle loading as a control parameter, vehicle automated transmission performance may be improved.

Although the preferred embodiment of the present invention has been described with a certain degree of particularity, various changes to form and detail may be made without departing from the spirit and scope of the invention as hereinafter claimed.

I claim:

1. A method for controlling a vehicular automated transmission system (10) in a vehicle having a suspension system including an inflatable member (44), the pressurization of which varies with vehicle loading, said transmission system including a multiple-speed transmission (16) and an electronic control unit (20) for receiving input signals (22) and processing same in accordance with predetermined logic rules to issue command output signals (24) to system actuators including a transmission controller (38), said method comprising:

sensing (40) a control parameter indicative of the pressurization of said inflatable member; and controlling said transmission system as a function of said control parameter.

2. The method of claim 1 wherein the pressurization of said inflatable member is controlled by a vehicle system independent of said automated transmission system.

3. The method of claim 1 wherein said transmission is a mechanical transmission.

4. The method of claim 2 wherein said transmission is a mechanical transmission.

5. The method of claim 1 wherein said transmission is a mechanical transmission having a plurality of ratios potentially suitable for start-from-stop operation and the current start ratio is selected as a function of the control parameter.

6. The method of claim 1 wherein said transmission is a mechanical transmission having a plurality of ratios, potentially suitable for start-from-stop operation and the current start ratio is selected as a function of the control parameter.

7. The method of claim 2 wherein said transmission is a mechanical transmission having a plurality of ratios potentially suitable for start-from-stop operation and the current start ratio is selected as a function of the control parameter.

8. A machine (20) for controlling shifting of a vehicular automated transmission system (10) in a vehicle having a suspension system includes an inflatable member (44), the pressurization of which varies with vehicle loading, including a multiple-speed transmission (16), said machine comprising:

input signal receiving means for receiving input signals including an input signal indicative of the pressurization of said inflatable member; and data processing means for processing said input signals in accordance with predetermined logic rules to issue command output signals (24) to system actuators including a transmission controller (38), said data processing means including logic rules for controlling said transmission system as a function of said input signal indicative of a vehicle suspension condition.

9. The machine of claim 8 wherein the pressurization of said inflatable member is controlled by a vehicle system independent of said automated transmission system.

10. The machine of claim 8 wherein said transmission is a mechanical transmission.

11. The machine of claim 9 wherein said transmission is a mechanical transmission.

12. The machine of claim 8 wherein said transmission is a mechanical transmission having a plurality of ratios potentially suitable for start-from-stop operation and the current start ratio is selected as a function of the input signal indicative of a vehicle suspension condition.

13. The machine of claim 8 wherein said transmission is a mechanical transmission having a plurality of ratios potentially suitable for start-from-stop operation and the current start ratio is selected as a function of the input signal indicative of a vehicle suspension condition.

14. The machine of claim 9 wherein said transmission is a mechanical transmission having a plurality of ratios potentially suitable for start-from-stop operation and the current start ratio is selected as a function of the input signal indicative of a vehicle suspension condition.

* * * * *